UNITED STATES PATENT OFFICE.

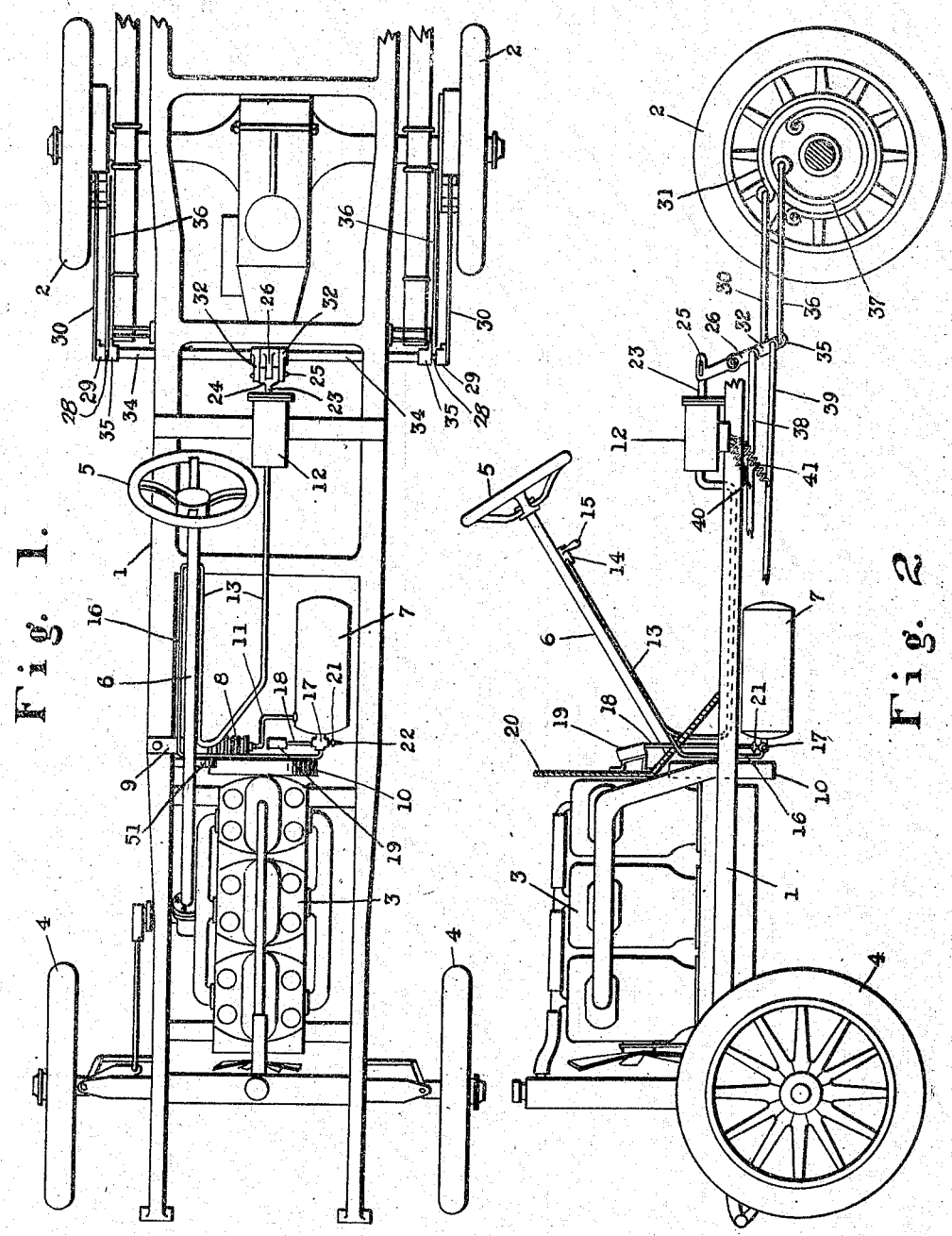

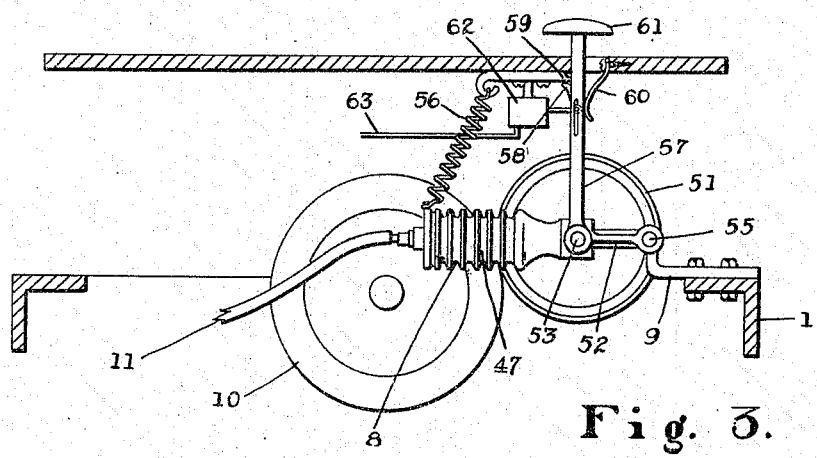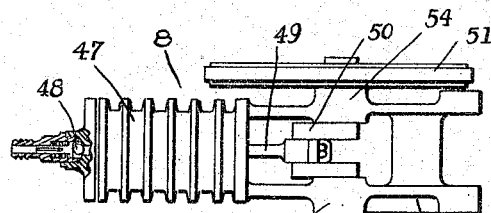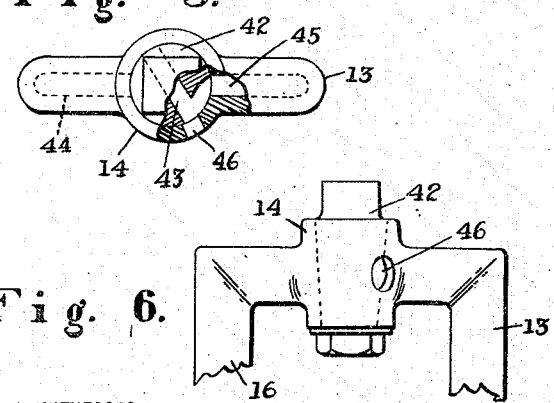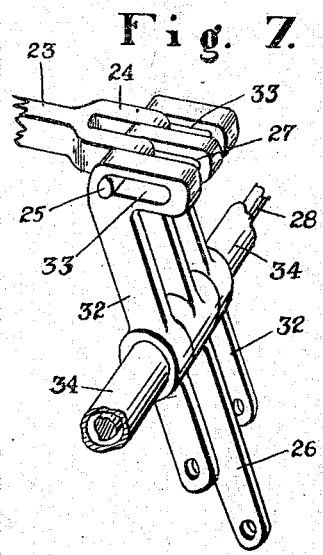

CHARLES A. BECKER, OF NEWARK, NEW JERSEY.

AUTOMOBILE AIR-BRAKE.

1,196,326.  Specification of Letters Patent.  Patented Aug. 29, 1916.

Application filed February 18, 1916. Serial No. 79,053.

*To all whom it may concern:*

Be it known that I, CHARLES A. BECKER, a citizen of the United States, and a resident of Newark, in the county of Essex and State of New Jersey, have invented certain new and useful Improvements in Automobile Air-Brakes, of which the following is a specification.

This invention relates to that class of automobile air brakes in which pneumatic means for applying and releasing the brakes are employed to supplement the usual hand or foot-operated means, while permitting said hand or foot-operated means to still be used independent of the air-operated means.

The objects of the invention are to enable the air-operated means to be controlled by a hand valve located in any position convenient to the driver, so as to permit the brakes to be readily applied or released by manipulation of said single valve; to secure pneumatic devices which shall operate both the service and emergency brakes commonly used on automobiles, and to apply the service brake slightly in advance of the emergency brake; to provide improved means for maintaining the necessary air pressure; to secure simplicity of construction and operation, and to obtain other advantages and results as may be brought out in the following description.

Referring to the accompanying drawings, in which like numerals of reference indicate the same parts throughout the several views, Figure 1 is a plan of an automobile chassis to which my invention has been applied; Fig. 2 is a side elevation of the same partially in section; Fig. 3 is a detail cross section of the chassis, showing the means for swinging the air pump into or out of engagement with the flywheel of the engine; Fig. 4 is a top view of the air pump, shown partially in section; Fig. 5 is a top view of the air control valve; Fig. 6 is a side elevation of the same, and Fig. 7 is a perspective view of certain brake operating levers, showing the cross pin at the opposite ends of their slots from its normal position.

In the specific embodiment of the invention illustrated in said drawings, the reference numeral 1 indicates the chassis of an automobile having driving wheels 2, 2, adapted to be driven by an engine 3, and also having front wheels 4, 4 adapted to be steered by a steering wheel 5 upon the upper end of a steering post 6, all as is common and well-known in the art.

Carried at any convenient part of the vehicle is an air storage tank 7 of suitable construction and capacity, and I have shown an air pump 8, hereinafter more fully described, supported by a bracket 9 upon the chassis in close proximity to the flywheel 10 of the engine 3 so as to be conveniently operated thereby. From the pump a duct 11 leads to the storage tank 7, and said duct is preferably flexible to permit the necessary movement of the pump.

An air-brake cylinder 12 is conveniently positioned upon the chassis and its piston connected by means hereinafter more fully described to the brakes of the automobile for operating the same. Operation of the brakes is accordingly effected by admitting air from the storage tank 7 to the cylinder 12, and preferably the brakes are applied through the agency of air pressure and are released by springs, though obviously this may be reversed or air utilized for both. A duct or pipe 13 leads from the cylinder 12 to a control valve 14 shown herein as positioned upon the steering post 6 and provided with a handle 15 whereby it may be operated by hand. Also leading to the valve 14 is another duct or supply pipe 16 from the storage tank and in open communication therewith, the control valve being adapted to permit flow of compressed air from the supply pipe 16 to the pipe 13 leading to the brake cylinder or to prevent such flow and exhaust said cylinder into the atmosphere, and by this means the operator may control the brakes of the automobile. Preferably the supply pipe 16 is attached to the storage tank through the agency of a coupling 17 from which also leads a pipe 18 to a pressure gage 19 supported in convenient position, as upon the dash board 20 of the automobile, and adapted to register the air pressure in the tank. Said coupling 17 may furthermore provide a valve 21 and nipple 22 by means of which compressed air may be drawn from the tank, when desired, for such purposes as inflating tires.

For operating the brakes from the cylinder 12, the piston rod 23 projecting therefrom is shown extending toward the rear of the vehicle and is provided with a forked end 24 carrying a transverse pin 25 which not only extends between the forks but projects from both ends, see Figs. 1, 2 and 7, said pin being fixed in the arms of the forked end 24 so as not to become dislodged or fall out. Between the arms of the forked end of the piston rod is positioned one end of a lever 26, said lever having a transverse slot 27 receiving the pin 25 and adapted to permit the lever to be swung independent of the piston rod. Said lever is secured, preferably intermediate its ends, to a horizontal rock shaft 28 free to rotate but otherwise stationary, and arranged so that swinging said lever will rock the shaft. This shaft extends to opposite sides of the vehicle and is provided thereat with arms 29 joined by suitable links 30 to the usual brake bands 31 on the rear wheels of the automobile.

Upon opposite sides of the lever 26 are two other levers 32, 32 having transverse slots 33, 33 at their upper ends receiving the projecting ends of the pin 25 and so arranged that the levers may be swung independent of the piston rod. These levers are made fast upon sleeves 34 rotatably mounted upon the rock shaft 28 and terminating short of the ends thereof, and upon the opposite ends of these sleeves are depending arms 35 connected by links 36 to other brakes 37 upon the wheels. Preferably the pair of levers 32, 32 operate the service or foot brakes of the automobile and the middle or single lever operates the emergency or hand brakes. Furthermore, in order to have the foot brakes operate in advance of the emergency brakes the slot 27 in the middle lever 26 is a little longer than the other slots 33, 33 and accordingly necessitates greater travel of the piston rod before the emergency brakes will be applied. The lower ends of the levers 26 and 32, 32 are connected by draft means 38, 39 to the usual manual operating means (not shown) ordinarily employed in this class of vehicle; springs 40, 41 are arranged as is usual to draw upon the said connections 38, 39 to retain the brakes normally released, and it will be noted from the construction disclosed that the springs tend to hold the levers 26 and 32 swung so the pin of the piston rod is at the ends of the slot away from the piston. Thus when the air pressure is admitted into the cylinder, the levers are swung immediately without the pin first having to travel the length of the slot. Greatest efficiency is therefore obtained and the brakes respond without unnecessary lost motion to the introduction of air to the cylinder.

Air is allowed to escape from the brake cylinder 12, when it is desired to release the brakes through the valve 14 as the same is turned to shut off the supply of air, the air returning to escape through the valve by the same pipe 13 which supplied the air from the valve to the said brake cylinder 12. This valve 14 (see Figs. 5 and 6 more especially) provides a rotatable plug 42 having a transverse passage 43 therethrough adapted in one position of the plug to connect opposite passages 44, 45 in the valve casing which passages are in connection with the supply pipe and pipe to the cylinder respectively. One end of this valve plug passage 43 is laterally enlarged and so arranged that as the plug is rotated to shut off the air from the inlet, said enlarged end still registers with the passage 45 from the cylinder and comes into registration also with a discharge orifice 46 in the valve casing so that the air in the cylinder may exhaust. The driver of the automobile therefore has perfect control of the brakes, aside from the usual manual control, through the hand valve 14 located upon his steering post convenient to the steering wheel, and obviously by turning this single valve in one direction or the other, the brakes can be instantly applied to any desired degree, held there as long as desired and released at pleasure.

The pump for obtaining the air pressure, see Figs. 3 and 4, provides a cylinder 47 having a suitable check valve 48 for preventing the air from reëntering the same after being forced into the duct 11 leading to the storage tank, and the piston in the pump cylinder is operated by a pitman 49 and crank 50 fast with respect to a driving or friction wheel 51. A frame 52 extends from the cylinder and supports the shaft 53 carrying the crank and friction wheel in bearings 54, and said frame extends beyond said bearings and is pivoted as at 55 to the bracket 9 upon said chassis. The pump is so arranged that when it is swung downward the friction wheel 51 peripherally engages the flywheel 10 of the automobile engine, to drive the pump, and it is intended that when the pressure gage 19 indicates adequate pressure in the storage tank 7, the pump shall be swung out of engagement with the engine flywheel.

Preferably, a spring 56 or other means is provided for keeping the pump normally raised in idle position, and means are provided for retaining it temporarily swung downward for pumping. Such means are shown as a stem 57 connected for convenience to the shaft 53 and extending upwardly through the floor of the automobile convenient to the operator, so as to be depressed by his foot. A shoulder 58 upon one side of the stem is adapted to engage under a stop 59 when the pump is lowered, said stop being at the same side of the stem as the shoulder 58, and upon the opposite side of the stem I have shown a spring 60 pressing the stem toward the stop so that as the stem is lowered the shoulder will automatically engage under the stop. A head 61 is shown at the top of the stem for the operator to place his foot upon for lowering the same, and it will be obvious that to release the pump from the flywheel of the engine, and stop its working, the stem 57 may be tilted to release the shoulder 58 from the stop 59, when the spring 56 will raise the pump. The operator may do this with his foot, or if desired automatic means may be employed which will release the stem as the pressure in the air storage tank 7 becomes sufficient. Such automatic means are illustrated conventionally in Fig. 3 by a cylinder 62 upon the under side of the floor of the car to which a pipe 63 leads from the storage tank 7, the piston in the cylinder being connected to the stem 57 and adapted to tilt said stem when the piston is moved outward by the air in the tank reaching the desired pressure, thus stopping the pump automatically. To use the pump with this construction it is necessary only to press the stem 57 by stepping momentarily upon its head, and nothing more; this throws the pump into operative relation to the flywheel of the engine and it runs until the desired pressure is attained in the storage tank, when the stem 57 is disengaged from the stop 59 by movement of the piston in the cylinder 62 and the spring 56 swings the pump upward into idle position again.

Obviously detail modifications and changes may be made in manufacturing my improved air brake without departing from the spirit and scope of the invention, and I do not wish to be understood as restricting myself except as required by the following claims when construed in the light of the prior art.

Having thus described the invention, what I claim is—

1. The combination with a motor vehicle and service and emergency brakes for the wheels thereof, of an air storage tank, a brake cylinder having a piston, means for admitting air to said cylinder from the tank and for exhausting the same, and means for operating both said service and emergency brakes from said piston at different points of its stroke.

2. The combination with a motor vehicle and service and emergency brakes for the wheels thereof, of an air storage tank, a brake cylinder having a piston, a valve for admitting air to said cylinder from the tank and for exhausting the cylinder, and means for connecting both service and emergency brakes to said piston to operate the same in proper sequence.

3. The combination with a motor vehicle and service and emergency brakes for the wheels thereof, of an air storage tank, a brake cylinder having a piston, a valve for admitting air to said cylinder from the tank and for exhausting the cylinder, brake levers having adjacent said piston slots substantially in alinement therewith, the slot of the emergency brake lever extending farther away from the piston than the slot of the service brake lever, and a cross pin fixed in said piston and extending into said slots.

4. The combination with a motor vehicle and service and emergency brakes for the wheels thereof, of an air storage tank, a brake cylinder having a piston with a forked end provided with a fixed cross pin, a valve for admitting air to said cylinder from the tank and for exhausting the cylinder, an emergency brake lever having its end between the arms of the said forked end of the piston, service brake levers having their ends lying on opposite sides of said forked end of the piston, all said brake lever ends being slotted in substantial alinement with the piston rod and receiving the cross pin thereof, the slot of the emergency brake lever extending farther away from the piston than the slots of the service brake levers, and brakes for the wheels of the vehicle connected to and adapted to be operated by said brake levers.

5. The combination with a motor vehicle and service and emergency brakes for the wheels thereof, of an air storage tank, a brake cylinder having a piston, a valve for admitting air to said cylinder from the tank and for exhausting the cylinder, brake levers having adjacent said piston slots substantially in alinement therewith, the slot of the emergency brake lever extending farther away from the piston than the slot of the service brake lever, a cross pin fixed in said piston and extending into said slots, and manually operable draft means connected to said brake levers at the opposite side of their fulcrum from said slotted ends.

6. The combination with a motor vehicle and service and emergency brakes for the wheels thereof, of an air storage tank, a brake cylinder having a piston with a forked end provided with a fixed cross pin, a valve for admitting air to said cylinder from the tank and for exhausting the cylinder, an emergency brake lever having its end between the arms of the said forked end of the piston, service brake levers having their ends lying on opposite sides of said forked end of the piston, all said brake lever ends being slotted in substantial alinement with the piston rod and receiving the cross pin thereof, the slot of the emergency brake lever extending farther away from the piston than the slots of the service brake levers, and manually operable draft means connected to said brake levers at the opposite side of their fulcrum from said slotted ends.

7. The combination with a motor vehicle of an air storage tank, a brake cylinder having a piston, means for admitting air to said cylinder from the tank and for exhausting the same, brake levers with slot and pin connections to said piston for operating them at different points of the stroke of the pistons, and service and emergency brakes connected to said brake levers respectively.

8. The combination with a motor vehicle and a brake for the wheels of said vehicle, of an air storage tank, means for utilizing compressed air from said tank to operate said brake, a pivoted air pump having a driving wheel, means for swinging said pump to engage said driving wheel with the engine flywheel of the vehicle, and means for automatically swinging said pump to disengage said wheels when a predetermined pressure is reached in the storage tank.

9. The combination with a motor vehicle and a brake for the wheels of said vehicle, of an air storage tank, means for utilizing compressed air from said tank to operate said brake, a pivoted air pump having a driving wheel, means for swinging said pump to engage said driving wheel with the engine flywheel of the vehicle, and means for utilizing air pressure from the storage tank to disengage said wheels when a predetermined pressure is reached in the storage tank.

10. The combination with a motor vehicle and a brake for the wheels of said vehicle, of an air storage tank, means for utilizing compressed air from said tank to operate said brake, a pivoted air pump having a driving wheel, means for swinging said pump to engage said driving wheel with the engine flywheel of the vehicle, detent means for holding the pump in such operative position, a piston operated by pressure from the storage tank to release said detent means, and a spring normally holding the pump in idle position.

11. The combination with a motor vehicle and a brake for the wheels of said vehicle, of an air storage tank, means for utilizing compressed air from said tank to operate said brake, a pivoted air pump having a driving wheel, a spring normally holding the pump in idle position, foot-operated means extending through the floor of the car for swinging said pump to engage its driving wheel with the engine flywheel of the vehicle, and releasable detent means for holding said foot-operated means in position to drive the pump.

CHARLES A. BECKER.